(12) United States Patent
Rexberg et al.

(10) Patent No.: US 6,690,953 B2
(45) Date of Patent: Feb. 10, 2004

(54) CALIBRATION METHOD FOR AN ADAPTIVE ANTENNA SYSTEM

(75) Inventors: Leonard Rexberg, Hässelby (SE); Magnus Johansson, Uppsala (SE); Eberhard Pauck, Hässelby (SE); Karsten Kruger, Arden (DK)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 490 days.

(21) Appl. No.: 09/772,944

(22) Filed: Jan. 31, 2001

(65) Prior Publication Data

US 2001/0016505 A1 Aug. 23, 2001

(30) Foreign Application Priority Data

Feb. 1, 2000 (SE) .......................................... 0000316-0

(51) Int. Cl.[7] ................................................. H04M 1/00
(52) U.S. Cl. ................. 455/562.1; 455/561; 455/67.11; 342/174; 342/368
(58) Field of Search ................................ 455/423, 424, 455/67.11, 67.13, 67.14, 67.16, 561, 562.1, 115.2, 115.1, 226.1, 226.2, 226.3, 226.4; 342/165, 169, 174, 367, 368, 371, 373, 374, 372; 343/700 R, 874, 875; 370/241, 252, 298; 375/224

(56) References Cited

U.S. PATENT DOCUMENTS 6,108,565 A * 8/2000 Scherzer ...................... 455/562
6,157,340 A * 12/2000 Xu et al. ...................... 342/174

FOREIGN PATENT DOCUMENTS

| EP | 0938204 A1 | 8/1999 |
| GB | WO 94/44920 | * 11/1997 |
| WO | 97/44920 | 11/1997 |
| WO | 99/57820 | 11/1999 |

* cited by examiner

Primary Examiner—Nay Maung
Assistant Examiner—Tanmay Lele (57) ABSTRACT

A method and a system are disclosed for achieving calibration with a minimum of hardware implementations. The method and system apply to base stations that have a "full adaptive antenna" implementation. The calibration accounts for irregularities from the source generator through channelizers, up-converters, mixers, power-amplifiers, and filters. A proposed illustrative embodiment of the set-up and routine accomplishes both transmit path and receive path calibration. An arrangement according to the invention uses the internal base station radio parts by sequentially switching signal paths from transmitter to receiver and thereby not needing external equipment. The necessary hardware switching then is combined with the duplex filters preferably positioned close to the base station. The method can simply be visualized by means of a basic flow diagram illustrating the three main steps being a first step of receive calibration to be repeated for all available receive frequencies, a second step of pre-transmit calibration and a third step of transmit calibration to be repeated for all available transmit frequencies.

9 Claims, 6 Drawing Sheets

$$\begin{bmatrix} Rx_1 \cdot \overline{R}x_1 & Rx_1 \cdot \overline{R}x_2 & \ldots & Rx_1 \cdot \overline{R}x_n \\ Rx_2 \cdot \overline{R}x_1 & Rx_2 \cdot \overline{R}x_2 & \ldots & Rx_2 \cdot \overline{R}x_n \\ \vdots & \vdots & \vdots & \vdots \\ Rx_n \cdot \overline{R}x_1 & Rx_n \cdot \overline{R}x_2 & \ldots & Rx_n \cdot \overline{R}x_n \end{bmatrix}$$

CALIBRATION METHOD FOR AN ADAPTIVE ANTENNA SYSTEM

TECHNICAL FIELD

The present invention relates to calibration of transmit and receive paths of an adaptive array antenna comprising multiple antenna branches in a radio base station arrangement.

BACKGROUND

Adaptive antennas have shown impressive potential for increasing capacity in cellular networks. Extensive theoretical works as well as field trials confirm this statement. When utilizing adaptive antenna beams, it is desired to steer the beams of the antenna continuously, and at the same time to steer nulls independently. Steering is accomplished by adjusting the relative phase and amplitude between the antenna branches in such a way that constructive or destructive interference will occur for beam pointing and nulling, respectively. That is, as opposed to a switched beam implementation where the best beam is chosen, such a solution deals with the actual implementation of continuous tracking and active disturbance nulling. This calls for a precise phase and amplitude adjustment of all involved hardware and software that constitute the signal path from the "source" to the antenna connector.

Today, capacity in a cellular network is limited by the ability to withstand co-channel interference. A certain "guard" level of the unwanted signal power received by the mobile has to be maintained below the desired signal power. This is assured by keeping base stations transmitting on the same frequency at a certain minimum geometrical distance from each other. In this way, other base stations transmitting on the same frequency will not disturb each other's mobiles. Base stations transmitting in other frequency groups may then on the other hand be placed in an interleaved fashion between these first mentioned base stations. This approach may be repeated until all the available frequencies are occupied, but in such a manner that they do not interfere with each other. The distances between the base stations and the total available number of frequencies result in a figure of merit for the capacity of a cellular network.

It is evident that if the power from interfering base stations as received by mobiles (and also received power at the base station) could be reduced in another way than physically relocating base stations, the capacity could be increased in the network. Frequencies could then be reused more often in a given physical area, in this way serving more subscribers. Limiting the transmitted power can be achieved by means of an antenna that has a narrower opening angle. In addition to this, the antenna beam has to be able to continuously track the mobile within its operating sector. Mainly two implementations exist: the switched beam solution and the full adaptive solution. In both cases an array of antenna elements is used, but in the latter case each element may be individually controlled, whereas in the former case only one out of several beams may be chosen. In the former case, a set of pre-set antenna beams is used whereas in the latter, one single beam is used, but continuously being tracked towards the mobile. This we refer to as a "full adaptive antenna" in this document.

A necessary condition is that each antenna path is calibrated so that possible irregularities may be accounted for and compensated. Both uplink and downlink has normally to be calibrated. However, the problem is more pronounced in the downlink direction (base station-to-mobile) whereas in the uplink (mobile-to-base station) the beam-forming algorithms can be made to auto-correct for phase errors.

The mostly used implementation of adaptive antennas is to use switched beams. Then the beam-former is preferably placed at the top of the mast close to the antenna array, and does not constitute any large phase errors. One connector at the input of the beam-former gives the proper excitation to all the antenna elements at the same time. This gives a beam in a certain direction. Choosing another input connector gives a beam in yet another direction. So, depending on for example the strongest received signal, the proper beam port is chosen and in this way no calibration is needed since it always only means one single RF path to the antenna. However, the above switched beam implementation does not give the freedom of steering the beam to an arbitrary position, nor the nulling out of interfering signals.

The most obvious solution for calibrating an antenna system would be to insert a signal at an appropriate position (in the transmit path) and then tracking the signal as it propagates through the system. The signal has to be detected at some close point to the antenna and then compared to the inserted signal. At first glance it needs additional hardware and detectors to be implemented. Usually an external source is applied to the equipment, and input to output signals are then compared. The difference between the two will then give the necessary phase and amplitude to be compensated for. The procedure in the receiving direction would be similar as for the transmit case. It is evident that the approach needs additional generator and detector equipment and it is difficult to perform such a calibration when the base station is under operation.

Usually calibration is made on the lab bench prior to installation, or by calibrating each part of the RF chain separately. Calibration of an array antenna only in the factory is not satisfactory with respect to usage at a site. Calibration has to be made during operation in some particular manner, and continuously being monitored. This is normally not fully supported today. If installed, one way would be to use an external separate generator to measure the signal path both in transmit branches and receive branches. This requires additional receivers tuned to the proper frequency together with some software implementation to calculate the amplitude and phase offsets. Moreover, signal insertion points and extraction points must be implemented into the base station.

Consequently calibration of array antennas is a problem without a proper solution today. Therefore there is a need for a method to calibrate array antennas at the site with a minimum of hardware requirement and which applies to base stations having a "full adaptive antenna" implementation.

SUMMARY

The present disclosure proposes a method and a system for achieving calibration with a minimum of hardware implementations and applies to base stations that have a "full adaptive antenna" implementation. It accounts for irregularities from the source generator through channelizers, up-converters, mixers, power-amplifiers, and filters. A proposed illustrative embodiment of the set-up and routine accomplishes both transmit path and receive path calibration. The arrangement according to the invention uses the internal base station radio parts by sequentially switching signal paths from transmitter to receiver and thereby not needing external equipment. The necessary switches then are combined with the duplex filters preferably close to the base station. The method can simply be visualized by a basic flow diagram presenting the three main steps being a first step of receive calibration to be repeated for all available receive frequencies, a second step of pre-transmit calibration and a third step of transmit calibration to be repeated for all available transmit frequencies.

A method according to the present invention is set forth by the independent claim 1 and the dependent claims 2–4. A system for calibration of an adaptable array antenna is set forth by the independent claim 5 and further embodiment are set forth by the dependent claims 6 to 9.

BRIEF DESCRIPTION OF THE DRAWINGS

The invention, together with further objects and advantages thereof, may best be understood by making reference to the following description taken together with the accompanying drawings, in which.

DETAILED DESCRIPTION

According to the present invention the proposed solution to the calibration problem is to use existing transmitters and receivers in the base station to perform calibration. The transmitters will be looped to the receivers and thereby eliminating the need for extra hardware. Assumed that each antenna branch has an implementation of a complete set of hardware equipment (FIG. 1), the calibration is performed in three steps:

Step 1: Receive branch calibration is first performed by tuning one of the transmitters to a receive frequency and the transmit signal fed at equal power by a power split to all receiving branches which in turn are terminated by receive channelizers. Comparisons of received signals on a channel to channel basis give the sought differences between receive branches at a receive frequency. (See FIGS. 2 to 4). The transmit portion of the duplex filters DPX are bypassed in this step.

Step 2: A pre-transmit calibration is performed in which step 1 is repeated, but now with transmitters tuned to an ordinary transmit frequency. Received signals in the receivers are compared, which gives calibration data for the receive branches at transmit frequency. This will be needed for the transmit branch calibration. (See FIGS. 5 and 6). The duplex filters DPX are all bypassed in this step.

Step 3: Transmit branch calibration is finally performed by connecting each transmit branch to one of the receive branches, on a one-to-one basis. By comparing the received signals by the receivers (at transmit frequency) consequently gives the calibration data for the transmit branches. Note that the receiving branches have already been calibrated for transmit frequency in Step 2. (See FIGS. 7 to 9). The receive portion of the duplex filters DPX are bypassed in this step.

However, it may be noted that in this calibration, antenna feed cables between duplex filters, DPX, and antenna elements are not included in the present discussed calibration set-up.

Figure 10:
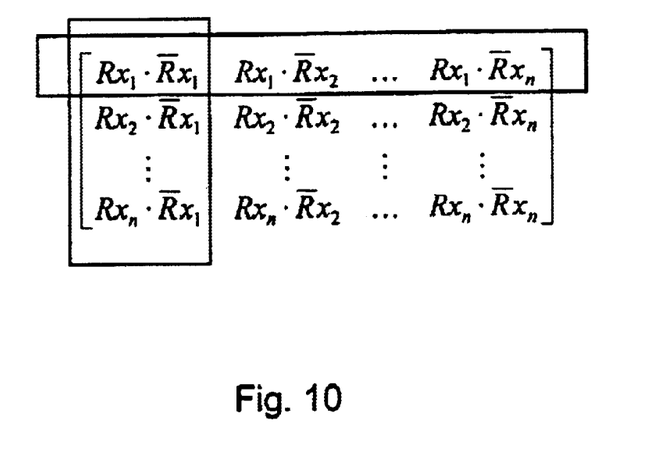
FIG. 10 shows signal correlation from all antenna branches compiled in a matrix for storage.

Calculation of the calibration data generally is made using a main building block of adaptive antenna algorithms, the Covariance Matrix (Also see FIG. 10). A subroutine for the Covariance Matrix is to a large extent an integral part of all algorithms dealing with adaptive beam-forming. Therefore, a minimum of additional software implementation is necessary for this calibration method.

The Covariance Matrix, which is of the same order as the number of antenna elements, consists of signal correlation factors between all antenna branches. Therefore, for example, by dividing the self-correlation of one signal path with the cross-correlation of another signal path will give the path difference between these two specific branches. Both amplitude and phase difference will be obtained this way.

Figure 1:
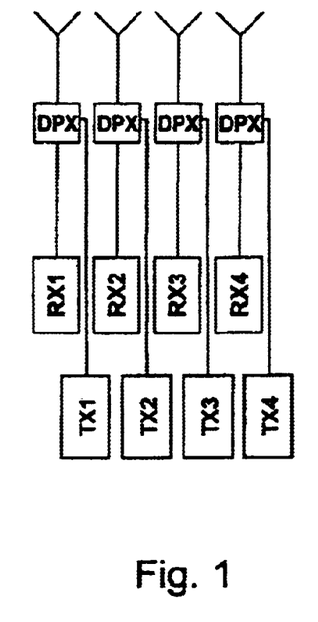
FIG. 1 is a condensed sketch of a base station with four RF antenna branches including a transmitter, a receiver and a duplex filter.

FIG. 1 shows a condensed sketch of an illustrative embodiment of a base station comprising four antennas. The four antennas are via a respective duplex filter, DPX connected to a receiver RX1–RX4 and a transmitter TX1–TX4. The receive/transmit parts may further, as well known to a person skilled in the art, include other radio equipment such as filters, amplifiers, channelizers and mixers.

Figure 2:
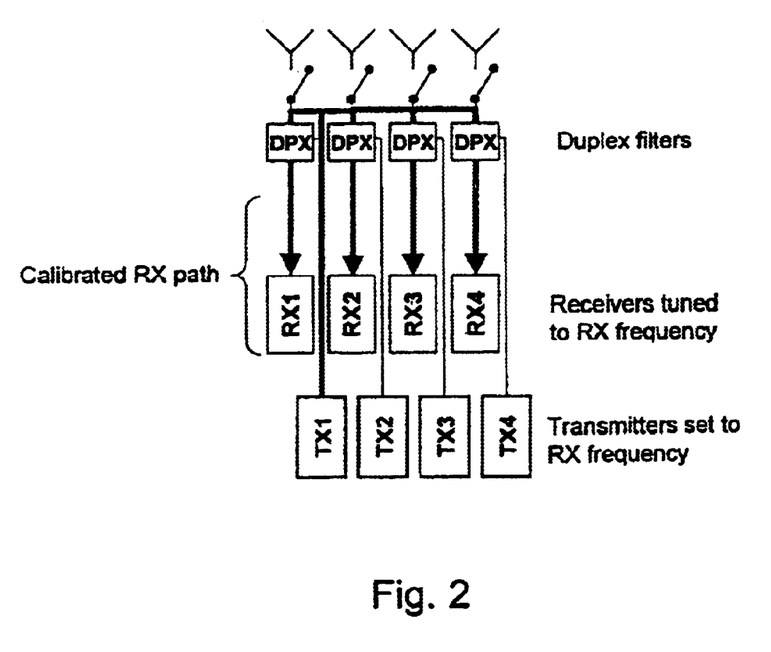
FIG. 2 illustrates a RX calibration whereby the receive branches are fed by one of the transmitters tuned to receive (RX) frequency.
Figure 3:
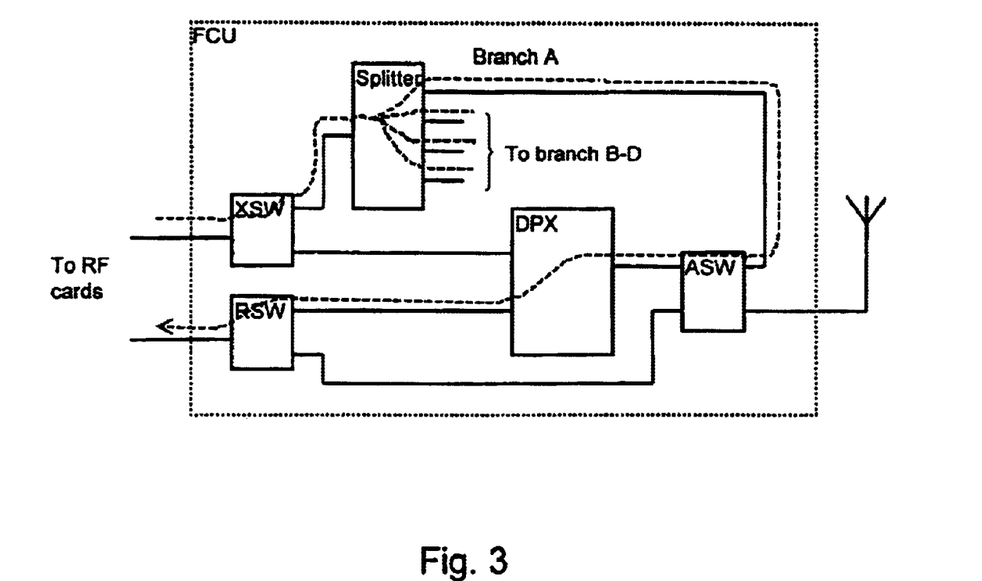
FIG. 3 shows a signal path in RX calibration.

In FIG. 2 a receiver calibration is illustrated. The present four receive branches are all via a signal splitter fed by one of the transmitters (TX1) tuned to receive frequency. Also the receive portion of each duplex filter is incorporated and will consequently be calibrated. As indicated in FIG. 2 the four antennas are preferably disconnected from the duplex filter DPX during the RX-path calibration sequence to avoid that external signals are registered by the receivers. The receive path calibration set-up is further illustrated in FIG. 3, which more in detail illustrates the signal path. In FIG. 3 XSW denotes a transmit switch, RSW denotes a receive switch, DPX is as before the duplex filter and ASW denotes an antenna switch.

Figure 4:
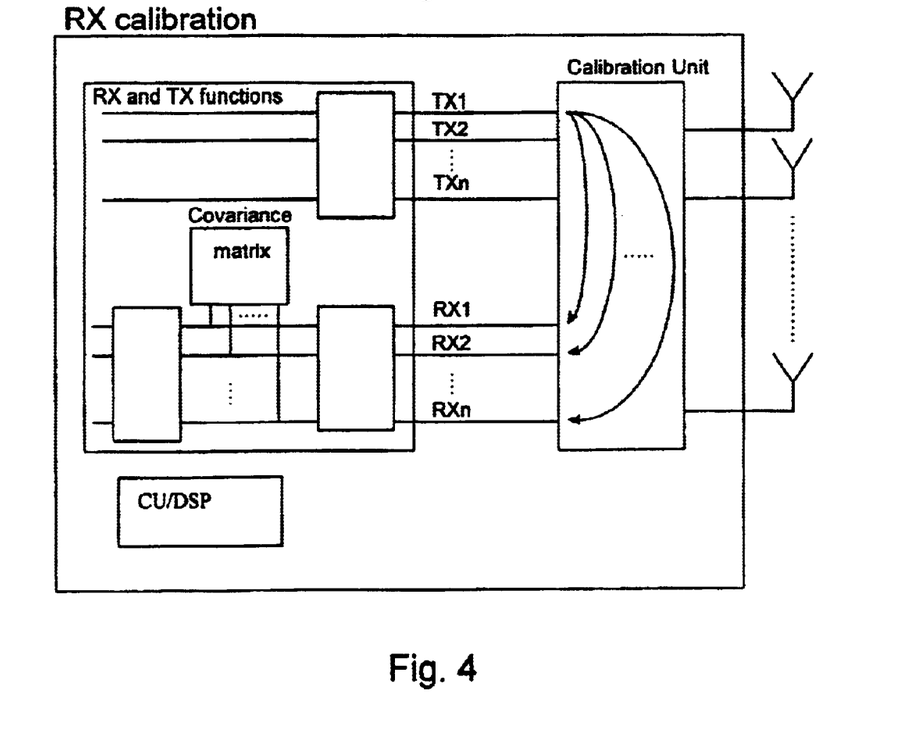
FIG. 4 shows the RX calibration block diagram including a signal correlation matrix calculation.

FIG. 4 illustrates RX-path calibration by means of a simple block diagram indicating a control unit CU utilized for providing receivers RX1 to RXn with a signal from a selected transmitter, in this case TX1. From the received calibration signals a covariance matrix is calculated.

Figure 5:
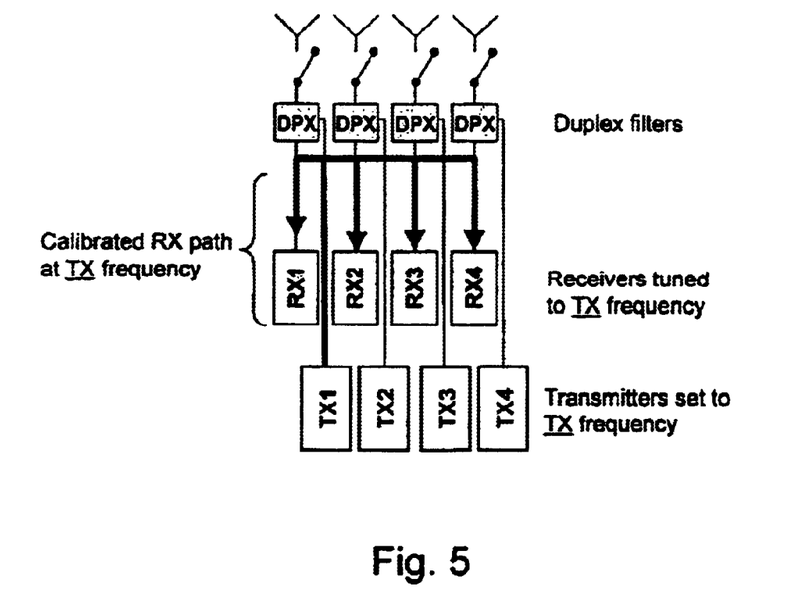
FIG. 5 illustrates a pre-TX calibration, which accomplishes calibration of receive branches but at transmit frequency with one transmitter tuned to transmit frequency and the signal split to all receiver branches.
Figure 6:
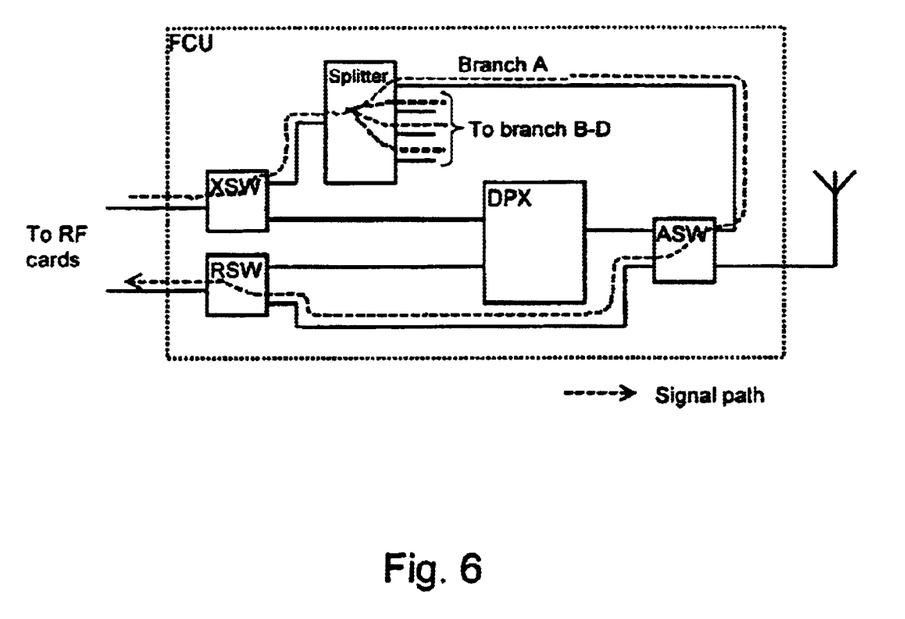
FIG. 6 illustrates the signal path in pre-TX calibration with the duplex filters by-passed in this operation when receiver branches are calibrated at TX frequency to obtain values to subtract from final transmit calibration results.

The pre-transmit calibration is then illustrated in FIG. 5. This accomplishes calibration of the receive branches but at transmit frequency. One transmitter, TX1, is tuned to transmit frequency and the signal is split to all receive branches for obtaining a calibration of the receiver branches to be used for subtraction from final transmit calibration results. Note that all duplex filters, DPX are bypassed in this operation. As indicated in FIG. 5 the four antennas are preferably disconnected from the duplex filter DPX also during the TX pre-calibration sequence to avoid that strong external signals are registered by the receivers. The pre-transmit calibration set-up is further illustrated in FIG. 6, which more in detail illustrates the signal path.

Figure 7:
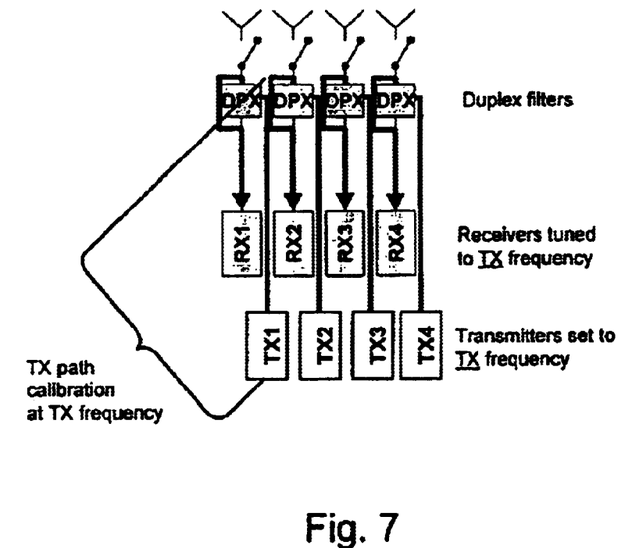
FIG. 7 illustrates TX calibration when each transmitter is tuned to transmit frequency and looped to their respective antenna branch receiver.
Figure 8:
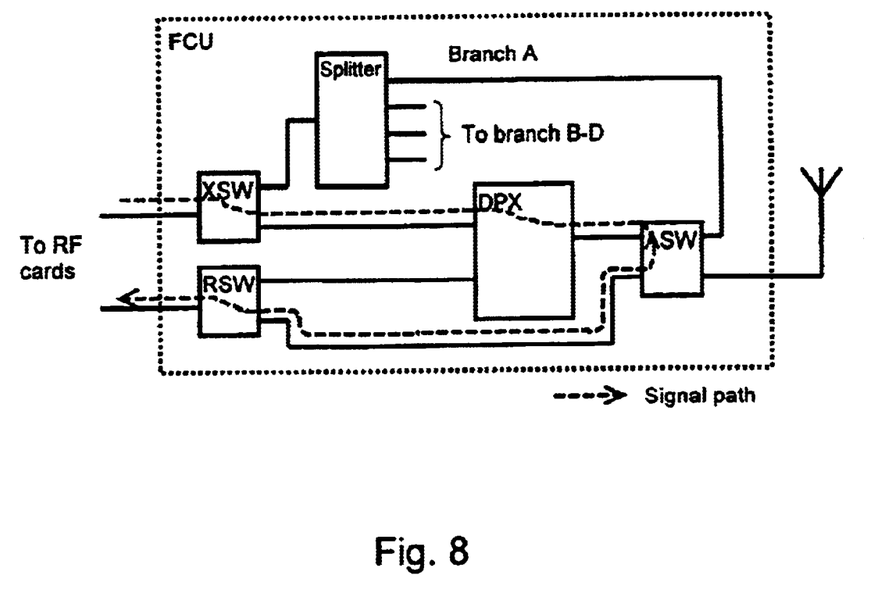
FIG. 8 shows the signal path in TX calibration when the transmit frequency signal is looped from transmitter to each receiver.

Furthermore, FIG. 7 illustrates transmit calibration when each transmitter TX1–TX4 is tuned to transmit frequency and looped to their respective antenna branch receiver RX1–RX4. The total signal path is calibrated and transmit path calibration is performed using pre-transmit data for the receive branch portion. As also indicated in FIG. 7 the four antennas are preferably disconnected from the duplex filter DPX during the TX-path calibration sequence to avoid that strong external signals will be registered by the receivers. Similar to FIGS. 3 and 6, FIG. 8 more in detail illustrates the signal path of the transmit calibration. The signal on transmit frequency is looped from transmitter to each receiver. The final transmit branch calibration is obtained as the residue value for amplitude and phase after subtraction of the pre-transmit calibration obtained from the receiver branch (at transmit frequency) in the discussed pre-transmit calibration Step 2.

Figure 9:
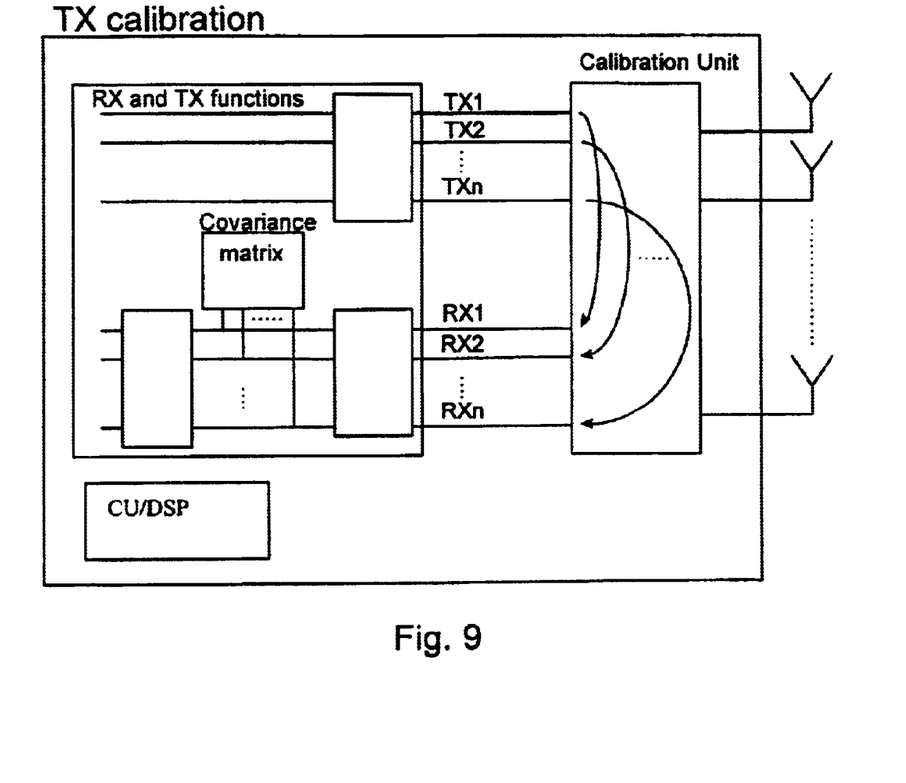
FIG. 9 shows the TX calibration block diagram layout of TX calibration with each transmitter looped to its respective receive branch radio and the covariance matrix for calculation of relative phase and amplitude of branches being indicated.

Similar to FIG. 4 a schematic block diagram of the TX calibration in Step 3 is illustrated in FIG. 9. Each transmitter is looped to their respective receive branch radio. The covariance matrix is indicated for calculation of relative phase and amplitude of branches.

Correlation factors between signals from all antenna branches are compiled in a matrix for storing as illustrated in FIG. 10. The correlation procedure gives a certain degree of averaging and noise reduction for more accurate results. Calculation of correlation between signals is summarized in short below.

Figure 11:
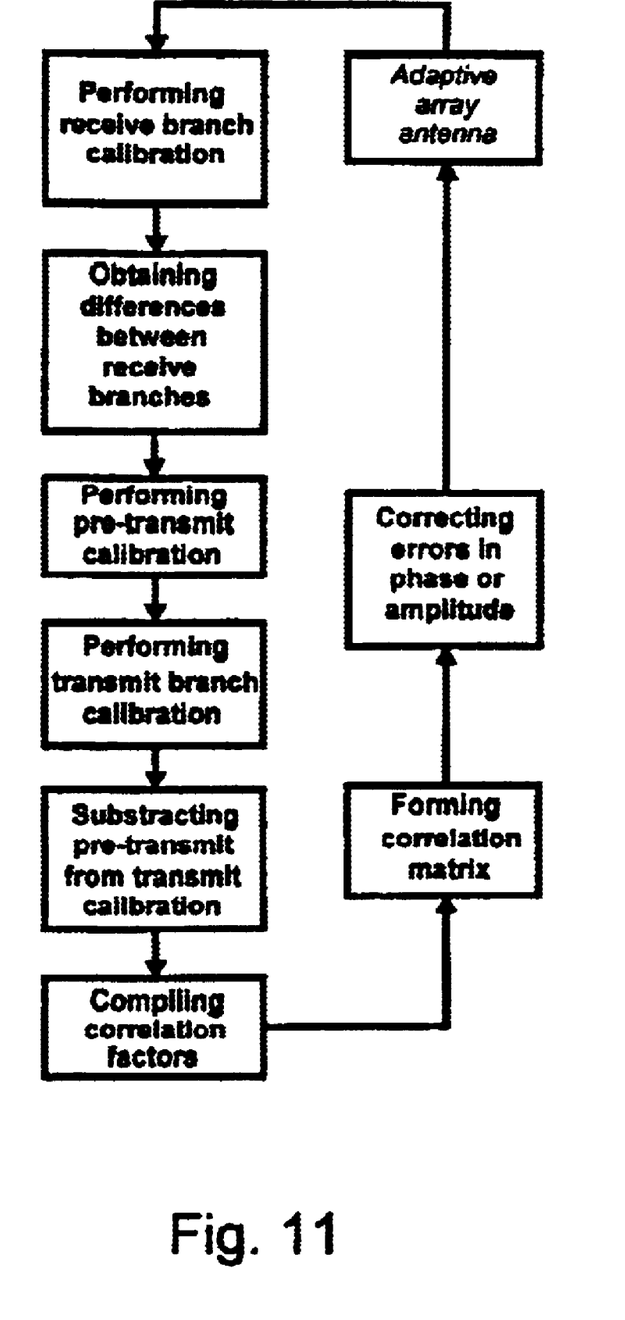
FIG. 11 is a basic flow diagram illustrating the present method for an adaptive array antenna calibration.

The main steps of the present calibration method according to the invention are also indicated in a simplified flow diagram of FIG. 11.

Calibration Implementation for Digital Signal Processor Software

In an illustrative embodiment signal correlation will be registered for the receive and transmit antenna branches and be sent to the control unit (CU) and/or a digital signal processing unit (DSP). The actual phase and amplitude differences between branches might not be necessary to compute, but rather to use the correlation computations directly. Below is described the way this might be implemented.

Calibration-Correlation

By computing the correlation between signals the phase difference between antenna branches is easily detected. The amplitude difference is also detectable, but might need some explanation. Consider two antenna branches RX1 and RX2 with phase and amplitude imbalance as:

$$RX1 = a_1 \cdot e^{j \cdot \alpha_1}$$

$$RX2 = a_2 \cdot e^{j \cdot \alpha_2}$$

The full correlation matrix between these two signals are computed as:

$$\rho_{21} = [RX1 \cdot \overline{RX2} = a \cdot \bar{a}_2 \cdot e^{j(\alpha_1 - \alpha_2)}]$$

$$\rho_{11} = RX1 \cdot \overline{RX1}$$

$$\rho_{12} = \rho^*_{21} = \overline{RX1} \cdot RX2$$

$$\rho_{22} = \overline{RX2} \cdot RX2$$

Covariance Matrix Adjustment

The above expression may be associated with the covariance matrix for the antenna array and the signals impinging onto it at an angle $\theta_i$. Consider a two element array antenna with element distance "I", where one (for simplicity) signal is incident. The covariance matrix with port antenna voltages ($V_1$, $V_2$) may be written:

$$V_1 = RX1 \cdot e^{j \cdot 2 \cdot \pi \cdot \cos(\theta_i)}$$

$$V_2 = RX2 \cdot e^{j \cdot 2 \cdot \pi \cos(\theta_i)}$$

$$C = \begin{bmatrix} V_1 \cdot \overline{V_1} & V_2 \cdot \overline{V_1} \\ V_1 \cdot \overline{V_2} & V_2 \cdot \overline{V_2} \end{bmatrix}$$

$$C = \begin{bmatrix} RX1 \cdot \overline{RX1} & RX2 \cdot \overline{RX1} \cdot e^{-j \cdot 2 \cdot \pi \cdot 1 \cdot \cos(\theta_i)} \\ RX1 \cdot \overline{RX2} \cdot e^{-j \cdot 2 \cdot \pi \cdot 1 \cdot \cos(\theta_i)} & RX2 \cdot \overline{RX2} \end{bmatrix}$$

from which, if correctly calibrated, we will obtain:

$$C_{calib} = \begin{bmatrix} 1 & e^{-j \cdot 2 \cdot \pi \cdot 1 \cdot \cos(\theta_i)} \\ e^{-j \cdot 2 \cdot \pi \cdot 1 \cdot \cos(\theta_i)} & 1 \end{bmatrix}$$

As can be seen above, calibration could be implemented by multiplying each element by the corresponding correlation factor according to:

$$C_{calib} = \begin{bmatrix} \dfrac{1}{RX1 \cdot \overline{RX1}} \cdot C_{11} & \dfrac{1}{RX2 \cdot \overline{RX1}} \cdot C_{12} \\ \dfrac{1}{RX1 \cdot \overline{RX2}} \cdot C_{21} & \dfrac{1}{RX2 \cdot \overline{RX2}} \cdot C_{22} \end{bmatrix}$$

or $$C_{calib} = \begin{bmatrix} \dfrac{1}{\rho_{11}} \cdot C_{11} & \dfrac{1}{\rho_{12}} \cdot C_{12} \\ \dfrac{1}{\rho_{21}} \cdot C_{21} & \dfrac{1}{\rho_{22}} \cdot C_{22} \end{bmatrix} = \dfrac{1}{\rho_{11}} \cdot \begin{bmatrix} C_{11} & \dfrac{\rho_{11}}{\rho_{12}} \cdot C_{12} \\ \dfrac{\rho_{11}}{\rho_{21}} \cdot C_{21} & \dfrac{\rho_{11}}{\rho_{22}} \cdot C_{22} \end{bmatrix}$$

Consequently, it is easily seen that the actual amplitude and phase differences do not necessarily have to be computed. It is sufficient to compute the correlation between all the antenna ports for a certain calibration signal. It is just a matter of multiplying each of the matrix elements by the inverse of the elements of the correlation matrix.

Base Station Internal Calibration

The same procedure as described above can be used for the internal calibration of the base station, thereby just interchanging one of the signals (RX1 or RX2) by for example TX1–TX4. Thus, for the Step 1 calibration, we have:

$$RX1 = k_1 \cdot TX1 \qquad RX1 \cdot \overline{TX1} = k_1 TX1 \cdot \overline{TX1}$$
$$RX2 = k_2 \cdot TX1 \Rightarrow RX2 \cdot \overline{TX1} = k_2 TX1 \cdot \overline{TX1}$$
$$RX3 = k_3 \cdot TX1 \qquad RX3 \cdot \overline{TX1} = k_3 TX1 \cdot \overline{TX1}$$
$$RX4 = k_4 \cdot TX1 \qquad RX4 \cdot \overline{TX1} = k_4 TX1 \cdot \overline{TX1}$$

Which gives:

$$\Rightarrow \text{calibration data}$$
$$k_1 = \frac{RX1 \cdot \overline{TX1}}{TX1 \cdot \overline{TX1}} \quad k_2 = \frac{RX2 \cdot \overline{TX1}}{TX1 \cdot \overline{TX1}}$$
$$k_3 = \frac{RX4 \cdot \overline{TX1}}{TX1 \cdot \overline{TX1}} \quad k_4 = \frac{RX4 \cdot \overline{TX1}}{TX1 \cdot \overline{TX1}}$$

Similar expressions are obtained for Step 2 and Step 3 in the calibration procedure.

The multiplications in the above expressions should be viewed as correlation operations instead of just multiplications. The result will be a scalar rather than a vector. TX1 is interpreted as the signal being sent to all receive branches RX1–RX4. The present notation should be regarded a correlation operation in the equations above rather than a pure multiplication.

It will be understood by those skilled in the art that various modifications and changes may be made to the present invention without departure from the scope thereof, which is defined by the appended claims.

What is claimed is:

1. A method for calibration of an adaptive antenna array connected via possible filters to receivers and transmitters of a radio base station, comprising the steps of
    performing a first step of receive branch calibration by tuning one of the transmitters to a receive frequency and feeding the transmit signal to all receiver branches via respective possible filters in the signal path;
    comparing received signals on a channel basis to obtain differences between receive branches at a receive frequency;
    performing a second step of pre-transmit calibration by tuning one transmitter to a transmit frequency and injecting the transmit signal to all receiver branches tuned to the transmit frequency while excluding respective possible filters in the signal path;
    performing a third step of transmit branch calibration by connecting each transmit branch to one of the receive branches via respective possible filters in the signal path;
    subtracting pre-transmit calibration from the transmit calibration result to obtain a residue value for amplitude and phase to be compared on a channel base to obtain differences between transmit branches at a transmit frequency;
    compiling correlation factors between signals from all antenna branches in a matrix for implementation in a control unit for obtaining an ability to correct errors in phase and amplitude in the adaptive antenna array.

2. The method of claim 1, comprising the further step of disconnecting possible filters from their antenna elements for avoiding influence by external signals during the calibration sequence.

3. The method of claim 1, comprising the further step of repeating the first step for all available receive frequencies and the second and third steps for all available transmit frequencies.

4. The method of claim 1, comprising the further step of using as control unit a Digital Signal Processor for calculating calibration phase and amplitude values to be used in normal operation of the adaptable array antenna.

5. A system for calibration of an adaptive antenna array connected via possible filters to receivers and transmitters of a radio base station comprising
    means for performing a receive calibration by tuning one of the transmitters to a receive frequency and feeding the transmit signal to all receiver branches via respective possible filters in the signal path;
    means for comparing received signals on a channel basis to obtain differences between receive branches at a receive frequency;
    means for performing a pre-transmit calibration by tuning one transmitter to a transmit frequency and inject this transmit signal to all receiver branches tuned to transmit frequency while excluding respective possible filters in the signal path;
    means for performing a transmit branch calibration by connecting each transmit branch to one of the receive branches via respective possible filters in the signal path;
    means for subtracting pre-transmit calibration from the transmit calibration result to obtain a residue value for amplitude and phase to be compared on a channel base to obtain differences between transmit branches at a transmit frequency;
    means for compiling correlation factors between signals from all antenna branches in a matrix for implementation in a control unit for obtaining an ability to correct errors in phase and amplitude in the adaptive antenna array.

6. The system of claim 5, comprising further switching members for disconnecting said possible filters from their antenna elements for avoiding influence by external signals during the calibration sequence.

7. The system of claim 5, wherein a control unit is used for distributing a selected transmitter signal branch to the receive branches for the antenna array calibration using internal signal sources only.

8. The system of claim 5, wherein said receive calibration, is repeated for all available receive frequencies and said pre-transmit calibration and said transmit calibration are repeated for all available transmit frequencies.

9. The system of claim 5, wherein a Digital Signal Processor is used as control unit for calculating calibration phase and amplitude values to be used in normal operation of the adaptable array antenna.

* * * * *